United States Patent [19]

Aso et al.

[11] Patent Number: 4,608,478
[45] Date of Patent: Aug. 26, 1986

[54] WIRE ELECTRODE CLAMPING MECHANISM OF WIRE-CUT ELECTRIC DISCHARGE MACHINE

[75] Inventors: Toshiyuki Aso; Yasuo Arakawa, both of Hino, Japan

[73] Assignee: Fanuc Ltd, Minamitsuru, Japan

[21] Appl. No.: 732,042

[22] PCT Filed: Aug. 30, 1984

[86] PCT No.: PCT/JP84/00417
§ 371 Date: Apr. 29, 1985
§ 102(e) Date: Apr. 29, 1985

[87] PCT Pub. No.: WO85/01000
PCT Pub. Date: Mar. 14, 1985

[30] Foreign Application Priority Data
Aug. 31, 1983 [JP] Japan .................................. 58-159370

[51] Int. Cl.[4] .................................................. B23H 7/10
[52] U.S. Cl. .................................. 219/69 W; 204/206; 219/69 R
[58] Field of Search .......................... 219/69 W, 69 R; 204/206; 242/149, 151

[56] References Cited

U.S. PATENT DOCUMENTS

| | | | |
|---|---|---|---|
| 3,891,819 | 6/1975 | Ullmann et al. | 219/69 W |
| 4,242,559 | 12/1980 | Roemer et al. | 219/69 W |
| 4,506,129 | 3/1985 | Katsube et al. | 219/69 W |
| 4,523,074 | 6/1985 | Okuda | 219/69 W |

FOREIGN PATENT DOCUMENTS 149133  9/1983  Japan .............................. 219/69 W Primary Examiner—Clarence L. Albritton
Assistant Examiner—Geoffrey S. Evans
Attorney, Agent, or Firm—Staas & Halsey

[57] ABSTRACT

A wire electrode clamping mechanism of a wire-cut electric discharge machine is constituted by a wire guide pipe for guiding the wire electrode; a pipe holder for accommodating the upper portion of the wire guide pipe in such a manner that the wire guide pipe is capable of moving up and down; and a clamping member disposed on an upper portion of the pipe holder and operated by the wire guide pipe for clamping the wire electrode, the clamping member clamping the wire electrode which has been passed through the interior of the wire guide pipe.

4 Claims, 14 Drawing Figures

Fig. 4
Fig. 6
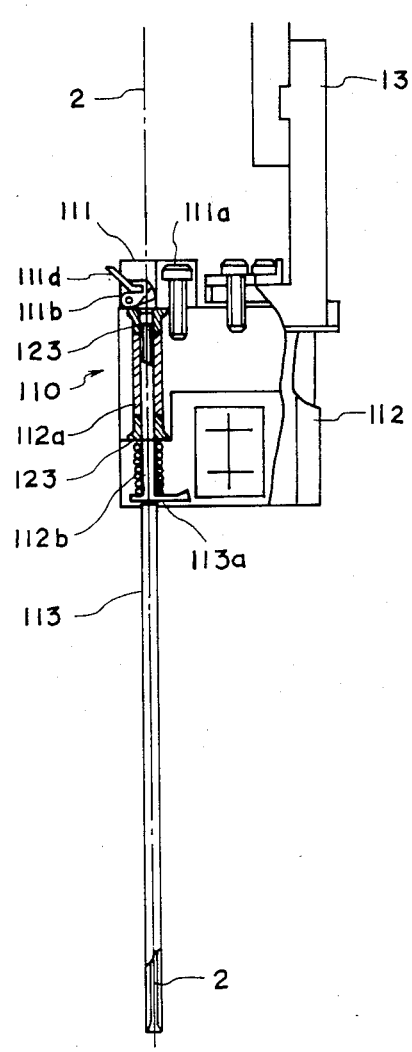
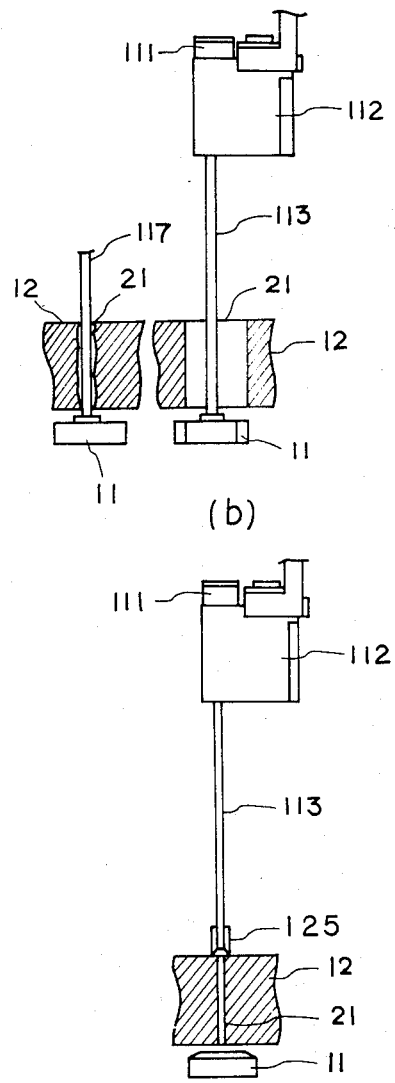

WIRE ELECTRODE CLAMPING MECHANISM OF WIRE-CUT ELECTRIC DISCHARGE MACHINE

DESCRIPTION

1. Technical Field

This invention relates to improvements in a wire electrode clamping mechanism mounted on a wire electrode pull-up mechanism for pulling up a severed wire electrode in a wire-cut electric discharge machine.

2. Background Art

A wire-cut electric discharge machine operates by impressing a pulsed voltage across a wire electrode and a workpiece to produce an electrical discharge across the intervening space for the purpose of eroding the workpiece, and moving the workpiece relative to the wire electrode on the basis of machining command data to cut the workpiece into any desired contour. Ordinarily, the workpiece is provided with a hole through which the wire electrode is passed at the start of cutting. In a case where a plurality of these cutting starting holes are provided, the wire-cut electric discharge machine has an attached automatic wire electrode connecting device for severing the wire electrode at the end of a job which has started at one of the cutting starting holes, passing the wire electrode through the next cutting starting hole, tensioning the wire electrode and carrying out automatic operation. Further, there are occasions where the wire electrode breaks within the workpiece if such machining cutting conditions as the impressed voltage, wire electrode feed speed and tension are improper during the electric discharge operation. In the event of such, breakage of the wire electrode, it is required that this fact be sensed by a wire breakage sensor provided on the electric discharge machine and that the wire electrode be restored automatically without delay by an automatic wire electrode recovery device attached to the wire-cut electric discharge machine.

FIG. 1 is a view showing the construction of a wire-cut electric discharge machine having the conventional automatic wire connecting and automatic recovery devices. In the Figure, numeral 1 denotes a column and 2 a wire electrode wound around a delivery reel 3 arranged on the column 1. The wire electrode 2 paid out by the delivery reel 3 is passed through a hole 21 in a workpiece 12 via a friction brake 4, a roller 5 driven by a drive motor 18, a guide roller 6, a lower guide 7, a wire electrode feed mechanism 9 and a lower nozzle 11. The wire electrode 2 is delivered to a wire electrode processing device 17 via a gripper 110 of a wire electrode clamping mechanism 30 provided on the distal end of a wire electrode pull-up mechanism 13, an upper guide 14, a conduction pin 15 and feed rollers 16. A table mechanism 19 on which the workpiece 12 is set is adapted to be moved in X and Y directions by two workpiece feed motors MX, MY, respectively. Numeral 20 denotes a drive motor for the wire electrode pull-up mechanism 13. By winding up or paying out a rope 22, one end of which is fastened to the pull-up mechanism 13, the motor moves the wire electrode pull-up mechanism 13 up and down. $L_1$ denotes a limit switch for sensing breakage of the wire electrode 2, and $L_2$, $L_3$ represent limit switches for sensing when lowering and elevation of the wire electrode pull-up mechanism 13 have been completed, respectively. Numeral 8 in the Figure denotes a cutter arranged between the wire electrode feed mechanism 9 and the lower nozzle 11, and numeral 10 designates a wire position sensor arranged between the cutter 8 and the nozzle 11.

In a wire-cut electric discharge machine having the above construction, the wire electrode 2 is guided so as to be oriented substantially vertically between the lower guide 7 and the upper guide 14 and is pulled upwardly by the feed roller 16 longitudinally so as to travel by the portion where the workpiece 12 is cut. A prescribed voltage is impressed across the wire electrode 2 and the workpiece 12, and the table mechanism 19 is driven by the workpiece feed motors MX, MY to transport the workpiece 12 in a horizontal plane, whereby electric discharge machining is performed along a desired contour.

When the wire electrode 2 breaks in passing through the workpiece 12, the limit switch $L_l$ for sensing wire breakage is actuated to immediately halt the electric discharge machining operation. Concurrently, rollers 91, 92 of the wire electrode feed mechanism 9 clamp the wire electrode 2 on the lower side of the workpiece 12 to stop the wire electrode 2 on the supply side from sliding down. Meanwhile, the spent wire electrode 2 which has come free of the workpiece 12 is pulled up by the feed rollers 16 and is fed into the wire electrode processing device 17 where the wire electrode is processed e.g., by it being cut up into small pieces. Next, the wire electrode 2 left in the workpiece 12 is pulled down by the wire electrode feed mechanism 9 and the distal end portion of the severed wire electrode 2 is pulled out of the workpiece 12. Thereafter, the table 19 is moved to return the workpiece 12 to the position of the cutting starting hole, the wire electrode pull-up mechanism 13 is lowered toward the workpiece 12 by the drive motor 20, the gripper 110 at the distal end thereof is brought into abutting contact with the workpiece 12, the wire electrode feed mechanism 9 is reactuated to feed the end of the wire electrode 2 into the cutting starting hole of the workpiece 12, the end of the wire electrode is fed so that a predetermined length of the wire electrode is projected from the upper side of the workpiece 12 as the wire electrode is guided by the lower nozzle 11, and in this way the end of the wire electrode is inserted into the gripper 110 of the wire electrode clamping mechanism 30.

Described next will be the gripper 110 of the wire electrode clamping mechanism 30. The conventional gripper 110 is constructed so as to operate in the manner shown in FIG. 2. Specifically, as shown in FIG. 2(a), the end of an operating rod 110d abuts against the upper surface of the workpiece 12 as the gripper 110 is lowered in the manner described above. As the gripper 110 continues to be lowered, the operating rod 110d pivots in the counter-clockwise direction about a pivot shaft 110f, causing a position adjusting screw 110n to abut against a clamping member 110c. With further descent of the gripper 110, as shown in FIG. 2(b), the position adjusting screw 110n rotates the clamping member 110c counter-clockwise about a shaft 110q so that a cam body 110h is brought into position above a cam operating body 110p of the operating rod 110d. As the gripper 110 continues to be lowered, the cam operating body 110p presses up on the cam body 110h, thereby amplifying the effect of the operating rod 110d to swing the clamping member 110c about the shaft 110q through a large angle in the counter-clockwise direction. As a result, the clamping member 110c is rotated counter-clockwise through an angle of about 90 degrees from the position shown in FIG. 2(a) to the position shown in FIG. 2(c). A coiled spring 110i is twisted and strongly biased while the clamping member 110c is being turned. When the lower surface of the operating rod 110 comes into intimate abutting contact with the upper surface of the workpiece 12, the rope 22 actuating the wire electrode pull-up mechanism 13 slackens, limit switch L2 opens, and motor 20 is stopped to halt the descent of the gripper 110.

Next, the wire electrode feed mechanism 9 is actuated to feed the wire electrode 2 upwardly, whereupon the end of the wire electrode 2 is threaded through the hole 21 in the workpiece 12 and passed through a nozzle 110l of the operating rod 110d, with the wire passing the inner side of a support wall 110j at the end of an arm 110a and emerging from the upper side of the arm, as shown in FIG. 2(c). This is followed by running the motor 20, shown in FIG. 1, in the reverse direction, whereupon the gripper 110 is raised. Now the operating rod 110d is rotated in the clockwise direction about the pivot shaft 110f owing to the restoration force of the coiled spring 110i. This motion is amplified and transmitted to the clamping member 110c owing to the relation between the cam operating portion 110p and the cam body 110h. The clamping member 110c rotates through a large angle in the clockwise direction, which is opposite to the direction mentioned above, about the shaft 110q. This rotating motion results from the restoring force of the coiled spring 110i. A restraining portion 110g urges the wire electrode 2 against the support wall 110j. As the gripper 110 continues to rise, the wire electrode 2 is clamped between the restraining portion 110g and the support wall 110j. Owing to the wedge effect of the restraining portion 110g, any attempt by the wire electrode 2 to fall is fully counteracted by a stronger clamping force. The gripper 110 thus is raised while carrying the clamped wire electrode 2 along with it. At the end of the elevating operation, limit switch L3 shown in FIG. 1 is closed to suspend the rotation of the motor 20. At this time the end of the wire electrode 2 has been pulled up to a position high enough to permit it to be clamped by the feed rollers 16, the latter then being rotated to pull up the wire electrode 2.

The foregoing conventional arrangement has a number of drawbacks. First, if the inner surface of the cutting starting hole 21 in the workpiece 12 is very rough, the wire electrode 2 will snag on the inner surface of the cutting starting hole 21 or the end of the wire electrode will protrude from the upper surface of the workpiece 12 upon being bent into the shape of a hairpin or will form an obstruction within the cutting starting hole. In cases such as these the gripper 110 will not be able to grasp the end of the wire electrode.

Further, if the diameter of the cutting starting hole 21 is larger than that of the nozzle 110l of the gripper 110 and smaller than the overall size of the gripper 110, or if a cut hole in the shape of a slit extends from the cutting starting hole, the end of the wire electrode 2 will move within the cutting starting hole and not reach the nozzle of the gripper 110, with the result that the latter will not be able to grasp the end of the wire electrode 2. Second, since the amount of vertical travel of the gripper 110 covers a long distance extending from the workpiece surface to the feed rollers 16, it is difficult to maintain the positional accuracy of the nozzle 110l, which is provided on the operating rod 110d of the gripper 110, with respect to the hole 21 in the workpiece 12, and to assure the positional accuracy of the wire electrode 2, which is held by the gripper 110, with respect to the feed rollers 16. As a result, a situation arises wherein the position of the hole 21 in the workpiece 12 and the position of the nozzle 110l of the operating rod 110d do not coincide, making it impossible for the wire electrode 2 to be clamped. Third, since the wire electrode 2 is completely unguided during movement, the wire becomes unstable and may twist or break. Fourth, since the clamping member 110c is rotated back and forth by the operating rod 110d, construction is complicated and adjustment difficult.

Accordingly, an object of the present invention is to provide a wire clamping mechanism for a wire-cut electric discharge machine, which clamping mechanism is capable of guiding the wire electrode reliably and has a simple construction.

SUMMARY OF THE INVENTION

The present invention provides a wire electrode clamping mechanism for a wire-cut electric discharge machine, the clamping mechanism being mounted on a wire electrode pull-up mechanism, which pulls a wire electrode up to a position of feed rollers disposed above a workpiece, for clamping the wire electrode delivered by a wire electrode feed mechanism disposed below the workpiece, the wire electrode clamping mechanism comprising a wire guide pipe for guiding the wire electrode, a pipe holder for accommodating the upper portion of the wire guide pipe in such a manner that the wire guide pipe is capable of moving up and down, and a clamping member disposed on an upper portion of the pipe holder and operated by the wire guide pipe for clamping the wire electrode.

Thus, according to the present invention, the wire clamping mechanism has a wire guide pipe for reliably guiding the wire electrode so that the wire electrode can be accurately and postively grapsed and raised even if the cutting starting hole has a very rough inner surface or a large diameter. As the wire electrode is being pulled up, it will not become unstable and twist, so that there is no danger of damage to the electrode. Further, according to the present invention, the wire guide pipe is provided on the lower portion of the clamping member. This makes it possible to shorten the travelling distance for pulling up the wire electrode, thereby enabling the clamping operation to be performed in reliable fashion. According to the invention, the wire guide pipe is accommodated by the pipe holder so as to be capable of moving up and down, and the clamping member is actuated by the vertical motion of the wire guide pipe itself. Accordingly, a complex arrangement for operating the clamping member is unnecessary.

BRIEF DESCRIPTION OF THE DRAWINGS

FIG. 4 is a partial, cross-sectional view showing the wire electrode clamping mechanism of the present invention;

FIGS. 6(a) and 6(b) are views for describing an example of using the arrangement of the present invention.

DETAILED DESCRIPTION OF THE PREFERRED EMBODIMENTS

An embodiment of a wire electrode clamping mechanism according to the present invention will now be described in detail with reference to FIGS. 3 through 6.

Figure 3:
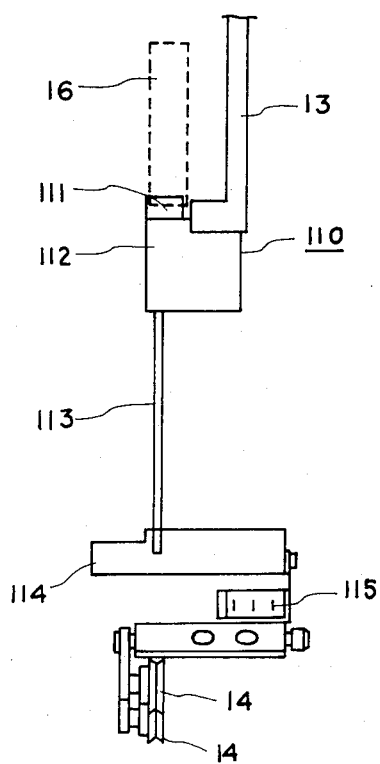
FIGS. 3(a) and 3(b) are views showing the construction of an embodiment of a wire electrode clamping mechanism according to the present invention.
Figure 3:
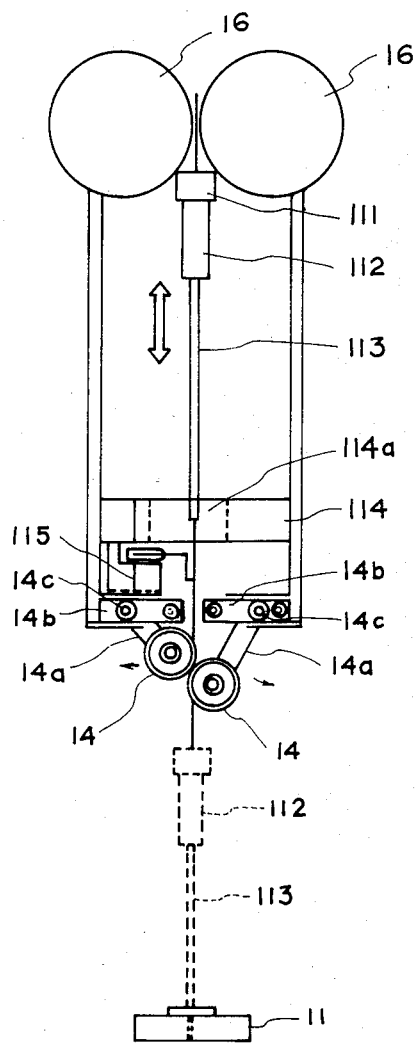

FIGS. 3(a) and 3(b) are views showing the construction of an embodiment of the present invention, in which FIG. 3(a) is a side view and FIG. 3(b) is a front view. FIG. 4 is a partial, cross-sectional view showing the detailed construction of a principal portion of the arrangement of FIG. 3.

In the Figures, numeral 110 denotes the above-described gripper (clamping mechanism), which is constituted by a clamping member 111, a pipe holder 112 having the clamping member 111 disposed on the upper portion thereof, and a wire guide pipe 113 having the upper portion thereof received in the pipe holder 112. As shown in FIG. 5(a), the clamping member 111 comprises a support wall 111a having a passage 111o through which the wire electrode is passed, a cam body 111b which rotates back and forth about a shaft AX, and a spring member 111c for bringing the cam body 111b into pressured contact with the support wall 111a. The arrangement is such that when the cam body 111b is rotated counter-clockwise about the shaft AX against the force of the spring member 111c, the cam body 111b separates from the support wall 111a to open the wire passage. As shown in FIG. 4, the wire electrode 2 is passed through the interior of the wire guide pipe 113, the upper portion whereof is inserted into sleeves 123, 123 force-fitted into a bore 112a in the pipe holder 112. Provided at a point along the pipe holder 113 is a flange 113a for limiting downward motion of the pipe holder. Provided between the flange 113a and the sleeves 123 is a spring 112b for urging the wire guide pipe 113 into downward movement at all times and for resisting upward movement of the pipe 113 internally of the pipe holder 112. More specifically, though the wire guide pipe 113 is capable of moving up and down in the bore 112a of the pipe holder 112, downward movement thereof is limited by the flange 113a, with the limiting action of the flange being shown in FIG. 4. Upward movement of the pipe compresses the spring 112b and, hence, is resisted thereby. The pipe holder 112 is connected to the wire electrode pull-up mechanism 13 of FIG. 1 and therefore moves up and down. The wire electrode pull-up mechanism 13 moves the pipe holder 112 up and down between the feed rollers 16 and the lower nozzle 11 or the upper surface of the workpiece 12, as shown in FIG. 3(b). Each of the guide rollers 14 is provided on a distal end of an arm 14a, which rotates back and forth about a shaft 14c through an angle of approximately 90° with respect to a support portion 14b. When the pipe holder 112 and wire guide pipe 113 descend, the arms 14a are swung in the directions of the arrows by a mechanism, not shown, to spread the guide rollers 14, 14 apart so that the wire guide pipe 113, pipe guide 112 and clamping member 111 are capable of moving between them. Note that a guide receiving member 114 is formed to include a slot 114a through which the wire guide pipe 113, pipe holder 112 and clamping member 111 pass. Numeral 115 denotes a limit switch for sensing breakage of the wire electrode 2.

Figure 1:
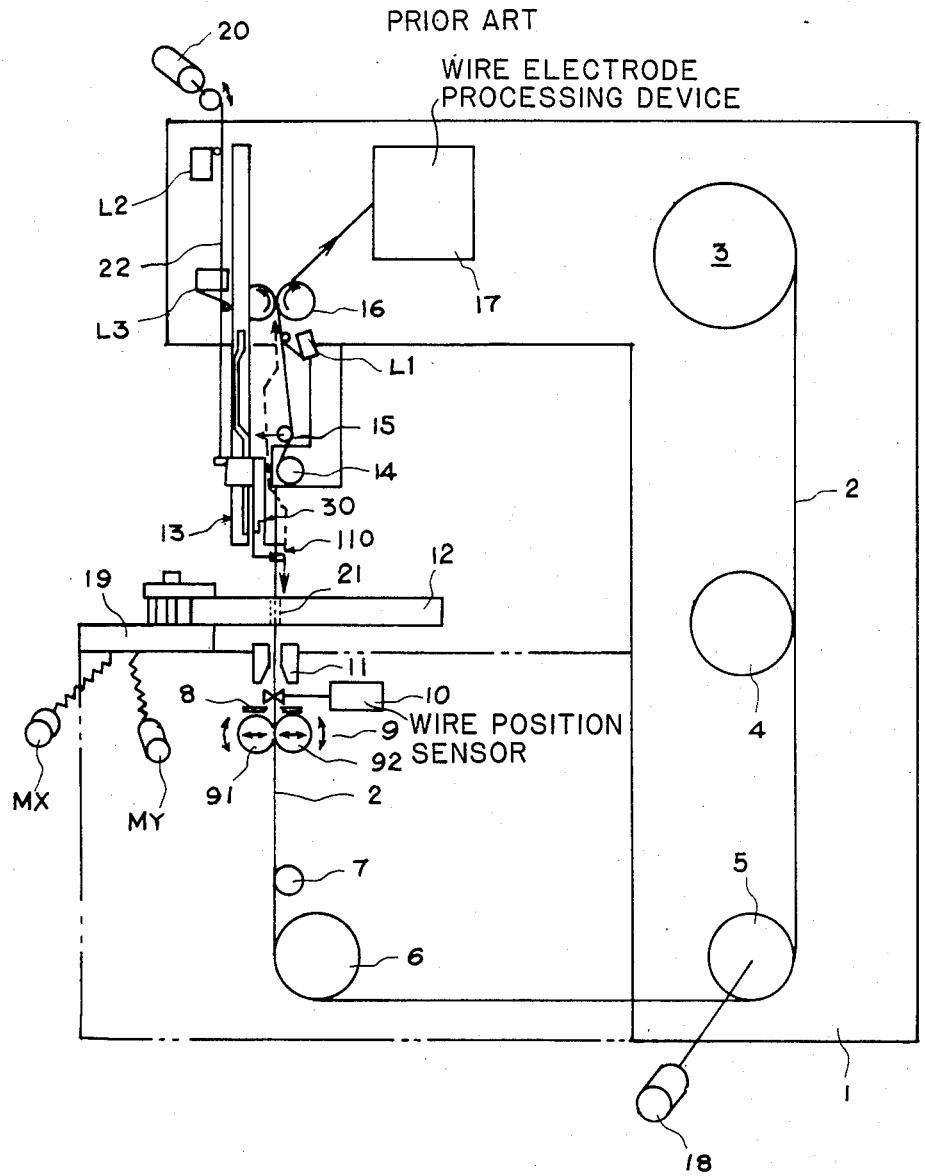
FIG. 1 is a side view showing the construction of a wire-cut electric discharge machine.
Figure 2:
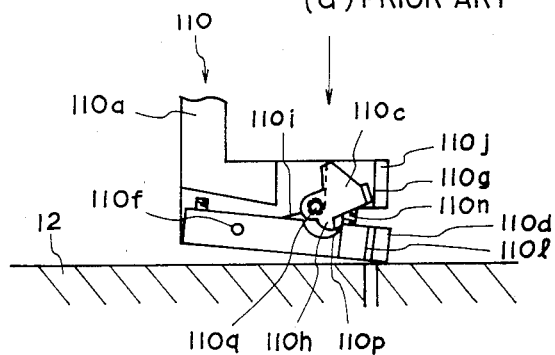
FIGS. 2(a), 2(b) and 2(c) are side views for describing a wire electrode clamping mechanism according to the prior art.
Figure 2:
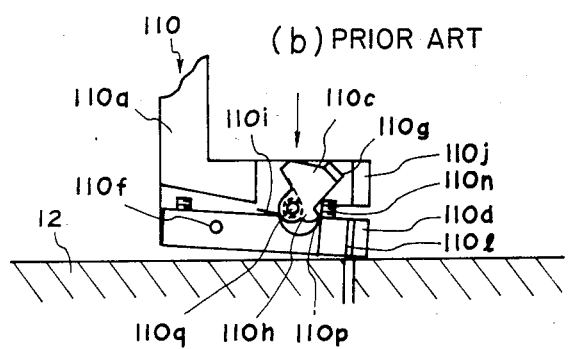
Figure 2:
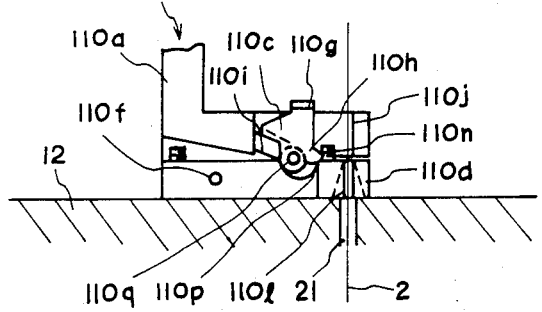
Figure 5:
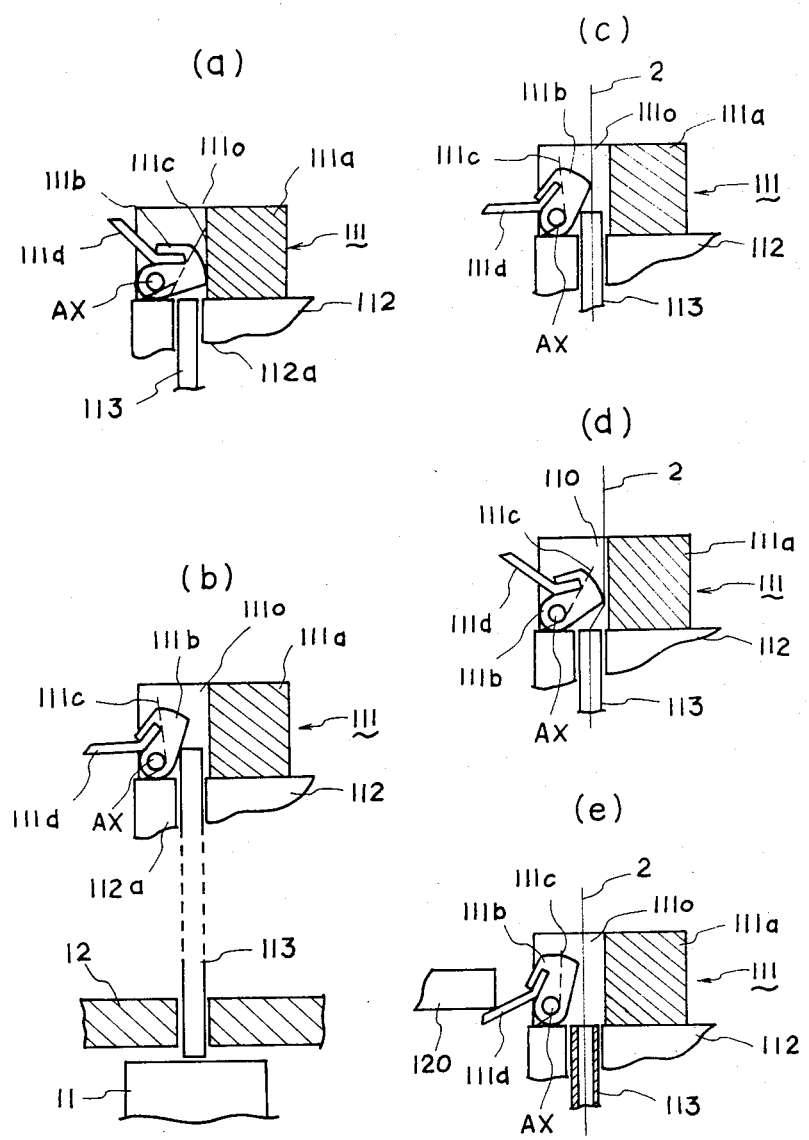
FIGS. 5(a), 5(b), 5(c), 5(d) and 5(e) are views for describing the operation of an arrangement embodying the present invention.

Let us describe the operation of the foregoing arrangement with reference to FIG. 5. The pipe 113 and cam body 111b ordinarily are in the attitude shown in FIG. 5(a). When breakage of the wire electrode 2 is sensed, the wire electrode pull-up mechanism 13 is lowered, causing the gripper 110 (the pipe holder 112, clamping member 111 and wire guide pipe 113) to descend so that the lower end of the wire guide pipe 113 supported by the pipe holder 112 passes through the workpiece and abuts against the upper surface of the lower nozzle 11. With further descent of the pipe holder 112, the wire guide pipe 113 is pushed up against the force of the spring 112b (FIG. 4). As a result, the upper end of the wire guide pipe 113 engages the lower side of the cam body 111b and pushes the cam body 111b against the force of the spring member 111c so that the cam body is rotated counter-clockwise about the shaft AX [FIG. 5(b)]. This causes a clearance to be formed between the cam body 111b and support wall, thereby opening the wire passage. Next, the wire electrode feed mechanism 9, shown in FIG. 1, is operated to feed the wire electrode 2 upwardly from the lower nozzle 11. The wire electrode 2 is passed through the wire guide pipe 113 and through the wire passage of the clamping member 111 until the wire electrode projects from the upper portion of the clamping member 111 [FIG. 5(c)]. The pipe holder 112 is then raised by the wire electrode pull-up mechanism 13, whereupon the wire guide pipe 113 decends relative to the pipe holder 112. In consequence, the cam body 111b is gradually rotated clockwise about the shaft AX owing to the baising force applied by the spring member 111c and clamps the wire electrode 2 against the support wall 111a, as shown in FIG. 5(d). It should be noted that the wire guide pipe 113 will not fall below the position shown in FIG. 5(d) by virtue of the flange 113a. When the pipe holder 112 is raised to the vicinity of the feed rollers 16 by the wire electrode pull-up mechanism 13, the end of the wire electrode 2 is inserted between the feed rollers 16 and clamped thereby. When the pipe holder 112 is raised further by the wire electrode pull-up mechanism and arrives at its uppermost position, a lever 111d of the cam body 111b abuts against an operating member 120, which is provided in the vicinity of the feed rollers 16, whereby the cam body 111b is rotated counter-clockwise about the shaft AX to unclamp the wire electrode 2 [FIG. 5(e)]. This makes it possible for the feed rollers 16 to feed the wire electrode 2 without meeting any resistance.

Thus, the wire electrode 2 is capable of being clamped by the action of the wire guide pipe 113 while being guided by the wire guide pipe 113.

In the embodiment set forth above, the pipe 113 operates by passing through the hole in the workpiece and abutting against the nozzle 11. This is possible if the diameter of the hole 21 in the workpiece 12 is larger than that of the wire guide pipe 113, as shown in FIG. 6(a). When the diameter of the hole 21 in the workpiece 12 is equal to or smaller than that of the pipe 113, it is permissible to adopt an arrangement as shown in FIG. 6(b), wherein an adapter 125 the outer diameter whereof is larger than that of the wire guide pipe 113, is mounted on the distal end of the wire guide pipe 113 and the lower end of the adapter 115 is brought into abutting contact with the upper surface of the workpiece 12, after which the wire guide pipe 113 is operated in the manner described above.

Though the present invention has been described based on the illustrated embodiment, the invention is not limited to the illustrated embodiment but can be modified in various ways without departing from the scope of the claims.

We claim:

1. A wire electrode clamping mechanism of a wire-cut electric discharge machine, the clamping mechanism being mounted on a wire electrode pull-up mechanism, which pulls a wire electrode up to a position of feed rollers disposed above a workpiece, for clamping the wire electrode delivered by a wire electrode feed mechanism disposed below said workpiece, the wire electrode clamping mechanism comprising:
   a wire guide pipe for guiding said wire electrode;
   a pipe holder for accommodating an upper portion of said wire guide pipe in such a manner that said wire guide pipe is capable of moving up and down; and
   a clamping member disposed on an upper portion of said pipe holder and operated by movement of said wire guide pipe for clamping said wire electrode.

2. A wire electrode clamping mechanism of a wire-cut electric discharge machine according to claim 1, wherein said clamping member comprises a support wall having a passage through which the wire electrode is passed, a cam member for opening and closing said passage and for clamping the wire electrode in cooperation with said support wall, and a spring member for constantly biasing said cam member in a direction for closing said passage, said cam member being operated by said wire guide pipe.

3. A wire electrode clamping mechanism of a wire-cut electric discharge machine according to claim 2, wherein said cam member has a lever which engages an operating member at an uppermost position of said pull-up mechanism, said cam member being operated against a biasing force of said spring member by engagement between said lever and said operating member to open said passage.

4. A wire electrode clamping mechanism of a wire-cut electric discharge machine according to claim 1, wherein said wire guide pipe has a flange for engaging said pipe holder to limit downward movement of said wire guide pipe, said wire guide pipe being biased for downward movement at all times by a spring disposed between said flange and said pipe holder.

* * * * *